(12) United States Patent
Schuette

(10) Patent No.: US 11,351,740 B2
(45) Date of Patent: Jun. 7, 2022

(54) DEVICE AND METHOD FOR JOINING A LENS TO A HOUSING OF A LIGHTING DEVICE

(71) Applicant: HELLA GmbH & Co. KGaA, Lippstadt (DE)

(72) Inventor: Andreas Schuette, Bueren (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 385 days.

(21) Appl. No.: 16/288,670

(22) Filed: Feb. 28, 2019

(65) Prior Publication Data

US 2019/0193337 A1 Jun. 27, 2019

Related U.S. Application Data

(63) Continuation of application No. PCT/EP2017/071223, filed on Aug. 23, 2017.

(30) Foreign Application Priority Data

Aug. 30, 2016 (DE) .................... 10 2016 116 122.5
Aug. 30, 2016 (DE) .................... 10 2016 116 141.1

(51) Int. Cl.
*B29C 65/78* (2006.01)
*F21S 41/29* (2018.01)
(Continued)

(52) U.S. Cl.
CPC .......... *B29C 65/7802* (2013.01); *B29C 65/02* (2013.01); *B29C 65/1635* (2013.01);
(Continued)

(58) Field of Classification Search
CPC ............ B29C 65/7802; B29C 65/7832; B29C 65/7835; B29C 65/7841
See application file for complete search history.

(56) References Cited

U.S. PATENT DOCUMENTS 4,613,105 A * 9/1986 Genequand .............. G01B 5/25
248/178.1
5,031,547 A * 7/1991 Hirose ..................... B23Q 1/60
108/140

(Continued)

FOREIGN PATENT DOCUMENTS

| DE | 102006053044 A1 | 5/2008 |
|---|---|---|
| DE | 102010024169 A1 | 12/2011 |
| EP | 3205481 A1 | 8/2017 |

OTHER PUBLICATIONS

International Search Report dated Nov. 22, 2017 in corresponding application PCT/EP2017/071223.

*Primary Examiner* — Philip C Tucker
*Assistant Examiner* — John Blades
(74) *Attorney, Agent, or Firm* — Muncy, Geissler, Olds & Lowe, P.C.

(57) ABSTRACT

A device for joining a lens with a housing of a lighting device of a motor vehicle, having a receiver for receiving and securing the housing and a pre-centering device for positioning the lens on the housing, wherein the pre-centering device includes a frame element and a plurality of positioning elements that are attached to the frame element for receiving the lens, wherein during a pre-centering process, the frame element of the pre-centering device is movable together with the joined lens relative to the receiver in such a way that the lens is aligned on the housing, which is received in the receiver.

8 Claims, 2 Drawing Sheets

(51) Int. Cl.

| | | |
|---|---|---|
| *F21S 41/20* | (2018.01) | |
| *B29C 65/02* | (2006.01) | |
| *B29C 65/00* | (2006.01) | |
| *B29C 65/16* | (2006.01) | |
| B29L 31/00 | (2006.01) | |
| B29L 31/30 | (2006.01) | |
| B29C 65/14 | (2006.01) | |
| F21S 43/27 | (2018.01) | |
| B29C 65/72 | (2006.01) | |
| B29C 65/06 | (2006.01) | |

(52) U.S. Cl.
CPC ...... *B29C 65/7841* (2013.01); *B29C 65/7847* (2013.01); *B29C 66/1312* (2013.01); *B29C 66/54* (2013.01); *F21S 41/28* (2018.01); *F21S 41/29* (2018.01); *B29C 65/06* (2013.01); *B29C 65/1412* (2013.01); *B29C 65/1432* (2013.01); *B29C 65/1467* (2013.01); *B29C 65/72* (2013.01); *B29L 2031/30* (2013.01); *B29L 2031/747* (2013.01); *F21S 43/27* (2018.01)

(56) References Cited

U.S. PATENT DOCUMENTS

| | | | |
|---|---|---|---|
| 2002/0034921 A1* | 3/2002 | Mizuno | B24B 13/005 |
| | | | 451/5 |
| 2005/0225991 A1 | 10/2005 | Yamazaki et al. | |
| 2005/0284851 A1* | 12/2005 | Enoki | B29C 66/54 |
| | | | 219/121.64 |

* cited by examiner

DEVICE AND METHOD FOR JOINING A LENS TO A HOUSING OF A LIGHTING DEVICE

This nonprovisional application is a continuation of International Application No. PCT/EP2017/071223, which was filed on Aug. 23, 2017, and which claims priority to German Patent Application No. 10 2016 116 122.5, which was filed in Germany on Aug. 30, 2016, and to German Patent Application No. 10 2016 116 141.1, which was also filed in Germany on Aug. 30, 2016, and which are herein incorporated by reference.

BACKGROUND OF THE INVENTION

Field of the Invention

The present invention relates to a device and a method for joining a lens with a housing of a lighting device of a motor vehicle.

Description of the Background Art

When installing a lighting device, such as a tail light, in the body of a motor vehicle, it is an essential requirement that the gap or joint path between the installed lighting device and the body deviates as little as possible from a predetermined path and thus terminates as flush as possible. In the production of the lighting device, however, greater tolerance deviations may arise, since both the lens and the housing of the lighting device are made from plastic material, wherein during production, warpage can occur due to dimensional manufacturing variations, which among other things can have an impact when joining the lens with the housing, and also in the later insertion into the body of the motor vehicle. The lens is commonly connected to the housing by means of a joining process, in particular a welding process, in that the weld joint is formed between the edge region of the lens and the edge region of the housing.

For technical reasons, receiving takes place by means of a support at the edge of the housing below the weld area to accommodate the necessary welding forces. Therefore, the housing cannot be aligned at the customer-supplied reference point system 3-2-1 in the welding receptacle, which consequently interrupts the required continuous dimensional chain.

From DE 10 2010 024 169 A1, a method is known by means of which position deviations of the lighting device, in particular of the lens of the lighting device, and the body of a vehicle are to be minimized. This is achieved by providing tolerance compensation areas to support points acting between the housing and the lens, in that the housing and the lens have a molded-on tolerance compensation area at each of their edge regions that are to be joined together. In the method, first a tolerance situation of the housing is measured between the support points for the lens formed on the housing and numerous support points formed on a body of the motor vehicle, where appropriate fixing elements of the housing are attached. Subject to the tolerance situation of the housing, an amount of material is determined, which has to be removed from the tolerance compensation area of at least one of the support points so that in a mounting position, the lens can be arranged on the housing flush with the body. Thereafter, the determined amount of material is removed from the tolerance compensation area of the at least one support point during a rework. Subsequently, the lens is arranged relative to the housing, wherein the lens is positioned in the mounting position by means of the support points having the tolerance compensation areas. Finally, the lens is joined with the housing in the mounting position by means of a welding process. Such a method for tolerance compensation comprises many processing steps, which requires a great outlay.

In contrast to the mechanical rework, the alignment of the components such as lens and housing is usually carried out as follows: the lens position and the corresponding deviation are determined in a downstream measuring process, which re-maps the reference system RPS on the basis of a measurement of the position with respect to the housing. On the basis of the measurement protocol, the lens is then realigned. However, this alignment process only takes into account dimensional deviations based on the overall distribution. If the distribution is not centrally located between the upper tolerance limit and the lower tolerance limit, a mean shift of the distribution is performed. The setter subsequently conveys the position of the lens with respect to the housing, aiming for the same gap path on both sides. In this case, the setter categorically assumes a stable variation and tries to convey the position of the process between the upper and lower tolerance limits. This manufacturing process thus has a significant weakness since it provides only a stable manufacturing process, i.e., "0" components in the manufacture of single parts/prefabrication. All variations resulting from the manufacture of single parts or the prefabrication thus pass through 1:1 and are mapped onto the joined component. Therefore, the setter must constantly intervene in the process to newly convey measuring points which cross the boundaries. This results in troubleshooting, interventions in the ongoing manufacturing process and further actions that involve high costs especially in the production area. However, the geometric reserves of the components to each other with respect to displacement are limited.

SUMMARY OF THE INVENTION

It is therefore an object of the present invention to provide a device and a method for joining a lens with a housing of a lighting device of a motor vehicle, by means of which the lens can be joined with the housing with high accuracy yet reduced cost.

The device according to an exemplary embodiment of the invention comprises a receiving device to receive and secure the housing, and a pre-centering device for positioning the lens on the housing, wherein the pre-centering device has a frame element and a plurality of positioning elements mounted on the frame element for receiving the lens, wherein during a pre-centering process, the frame element of the pre-centering device can be moved together with the joined lens relative to the receiver in such a way that the lens is alignable on the housing accommodated in the receiving device.

In the inventive device, providing a pre-centering device creates a tolerance compensation system which allows for very accurate positioning of the lens on the housing, so that during installation in a body of a motor vehicle, the lens can rest flush against the enclosing body with minimal tolerance. The pre-centering device allows for positioning the lens relative to the housing which is disposed in a fixed, defined position.

In the context of the invention, the inventive device for joining includes each device that serves to arrange a lens on a housing of a lighting device, wherein the joining comprises the positioning of the lens. The term joining is understood to be any type of arrangement, positioning and/or alignment with or without attachment or cohesive, force-fitting or frictional connection between the parts to be joined. Thus, the joining device must not necessarily be designed to cohesively connect the two joining parts. Consequently, in the present case, joining can also be understood as a process which is aimed at essentially or exclusively positioning the joining parts with respect to one another.

For this purpose, the housing is accommodated in a receiver in a position defined by a reference point system. The reference point system has at least two, preferably three, reference points arranged in a plane, on which the housing can be positioned in the receiver in a defined manner. By means of the pre-centering device, the lens can be aligned with the reference point system defined for the housing, so that an accurate and defined alignment of the lens relative to the housing is provided. The pre-centering device comprises a frame element and a plurality of positioning elements that are mounted on the frame element for receiving the lens. The frame element is movably supported so that the positioning elements and thus also the lens accommodated between the positioning elements can be moved relative to the receiver by way of a movement of the frame element. Together with the mounted lens, the frame element can be moved in such a way that it can be displaced into a defined position relative to the housing that is accommodated in the receiver. If the frame element is aligned relative to the housing, the positioning elements fixed to the frame element are also aligned relative to the housing, so that the lens mounted between the positioning elements is also aligned relative to the housing mounted in the receiver. After the pre-centering process, when the lens is aligned with the housing in an optimal position, a joining process, in particular a welding process, can take place to cohesively connect the lens with the housing.

The device preferably comprises a base plate, which has been pre-aligned with the head piece in the setup process, on which the receiver is fixedly positioned and on which the frame element of the pre-centering device is movably supported. The frame element is preferably movably supported on the base plate in such a way that the frame element can be moved in parallel to the surface of the base plate, i.e., planarly. By positioning the receiver and the frame element and thus the pre-centering device on the same base plate, the pre-centering device can be positioned in a defined manner relative to the receiver.

For the movable support of the frame element, a plurality of supporting elements can be respectively distributed on the underside of the frame element that points towards the base plate. By means of the supporting elements, the frame element can be particularly easily displaced along the base plate. The supporting elements are embodied, for example, as ball bearings and are preferably arranged distributed uniformly over the area of the frame element so that in particular, a tilting movement of the frame element during a movement above the base plate can be avoided. The ball bearings can be embodied as ball bushings. The frame element is locked by means of locking bushings.

The frame element is preferably arranged such with respect to the receiver that the frame element annularly encloses the receiver and/or has at least a rectangular or annular, in particular closed, contour. The frame element can thus border the receiver. In this case, the inner surface of the frame element pointing in the direction of the receiver is spaced from the outer surface of the receiver pointing in the direction of the frame element in such a way as to ensure sufficient freedom of movement of the frame element with respect to the receiver. The frame element can have any shape, wherein the contour or the shaping of the inner surface of the frame element is preferably adapted to the contour or shaping of the outer surface of the receiver.

For example, there may be stop elements on the frame element for positioning the frame element on the reference points of the housing. By means of the stop elements, the frame element can be aligned relative to the housing. The frame element can be moved in such a way that the stop elements of the frame element bear against the housing. This also makes it possible to align the frame element with the reference point system of the housing. The stop elements may, for example, each be designed as projections formed on the inner surface of the frame element pointing in the direction of the receiver, which project from the inner surface of the frame elements.

For example, actuators are mounted on the base plate, with which the frame element can be clamped on the housing together with the lens via the stop elements. For this purpose, the lens is mounted by the positioning elements of the pre-centering device by said device being clamped onto the frame element in a plane parallel above the base plate while performing a planar movement.

For this purpose, the positioning elements may be formed such that a number of positioning elements are designed as actively operable block slides, and a number of positioning elements are designed as passively spring-loaded slides for the clamping receiving of the lens, wherein the number of positioning elements formed as block slides preferably corresponds to the number of positioning elements formed as a spring-loaded slides. The lens can be placed on the positioning elements formed as block slides and subsequently clamped against the block slides with the positioning elements designed as spring-loaded slides. In each case, a block slide is preferably located opposite a spring-loaded slide.

Further, the device may comprise a holder, by way of which the aligned lens can be mounted after the pre-centering process and removed from the pre-centering device. The holder is preferably positioned above the pre-centering device and can be displaced upwards and downwards, relative to the pre-centering device or the receiver, such that by lowering it, the lens held in the holder can be moved in the direction of the pre-centering device and the housing held in the receiver, and that by raising it, it can be moved away therefrom again. In particular, the lens can be held by the holder during the joining process that follows the pre-centering process.

In the method according to the invention, the housing is received and secured in a receiver, and the lens is positioned on the housing by means of a pre-centering device having a frame element and a plurality of positioning elements attached to the frame element, by the lens being received by the positioning elements and together with the received lens, the frame element being moved such with respect to the receiver that the lens is aligned with the housing that is mounted in the receiver.

The method according to the invention provides a tolerance compensation system, in which the lens can be positioned on the housing with a very high accuracy by using the pre-centering process, so that during installation in a body of a motor vehicle, the lighting device can be inserted as flush as possible in the body and the position of the lens to the body has the lowest possible tolerance. The pre-centering process enables optimized positioning of the lens relative to the housing arranged in a fixed, defined position. For this purpose, the housing is first placed in a defined position in the receiver and fixed in the receiver. The pre-centering device comprises a frame element and a plurality of positioning elements for receiving the lens, which are secured to the frame element.

The lens is received by the pre-centering device and aligned by means of the pre-centering device on the housing, which is firmly positioned in the receiver. For this purpose, the frame element of the pre-centering device is movably supported, so that the positioning elements and thus the lens joined and held between the positioning elements can be moved via a movement of the frame element, relative to the receiver and thus relative to the housing. The frame element is moved together with the joined lens in such a way that this is shifted to a defined position relative to the housing joined in the receiver. If the frame element is aligned relative to the housing in the defined position, the positioning elements fixedly arranged on the frame element and thus the lens held by the positioning elements are also aligned relative to the housing. In particular during the pre-centering process, the receiver is preferably fixed in a secure position, as opposed to the frame element, so that movement of the housing during the pre-centering process can be excluded.

Due to the pre-centering process, it can be arranged that the alignment of the lens is also based on the reference point system. By means of the pre-centering device, the lens can be aligned using the reference point system defined for the housing, so that the lens can be aligned relative to the housing as accurately and definedly as possible.

The movement of the frame element may preferably take place in such a way that the frame element is aligned with the housing received in the receiver. For alignment on the housing, preferably stop elements are formed on the frame element, wherein the frame element can be moved in such a way that the stop elements formed on the frame element are brought to bear against the housing. By means of the stop elements, the frame element can be aligned relative to the housing. The frame element can thereby be moved or shifted in such a way until all the stop elements of the frame element rest on the housing. By means of this defined contact of the frame element on the housing, the frame element can be aligned using the reference point system of the housing. By aligning and positioning the frame element on the housing using the stop elements, the lens received by the positioning elements can be simultaneously aligned on the housing. The stop elements can be designed, for example, like the projections formed on the inner surface of the frame element pointing in the direction of the receiver, which project from the inner surface of the frame element.

The movement of the frame element may be electrically or pneumatically controlled. For example, pneumatic cylinders or electric motors can engage on the frame element for this purpose, which can bring about movement of the frame element. The frame element is preferably movably supported on a base plate, so that the frame element, which is preferably plate-shaped, can be displaced parallel to the base plate. For the movable support, the frame element can be arranged on the base plate by means of ball bearings. The receiver for the housing can also be positioned on this base plate, wherein the receiver are preferably secured in a fixed position on the base plate.

To ensure a secure hold of the lens when receiving between positioning elements, the lens can be clamped between the positioning elements. Slipping and/or tilting movements of the lens, in particular during the movement of the frame element, can thereby be prevented.

After the pre-centering process, the aligned lens can be received by a holder and removed from the pre-centering device. The holder is preferably positioned above the pre-centering device and can be moved upwardly and downwardly, relative to the pre-centering device or the receiver, so that the lens received by the holder can be removed from the pre-centering device by raising the holder. After the pre-centering process, the lens can thus be transferred from the positioning elements to the holder. For example, by generating negative pressure, the lens can be received by the holder and held therein.

After the pre-centering process and thus after alignment of the lens relative to the housing, a joining process, in particular a welding process, can be started, in which the aligned and pre-centered lens is cohesively connected to the housing. This can be done in such a way that after transferring the lens from the positioning elements to the holder, the aligned and pre-centered lens is first moved upwards using the holder and thus moved away from the housing. Thereafter, infrared emitters can be introduced, which heat the welding contours of the housing and of the lens. The welding contours are preferably the edge regions of the housing and of the lens. Subsequently, the infrared emitters can be removed and the lens held in the holder can be lowered in the direction of the housing until the lens rests with its welding contour or its edge region on the welding contour or the edge region of the housing. Then, the actual joining, in particular welding, can take place. For example, this can be done by means of a friction welding process.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
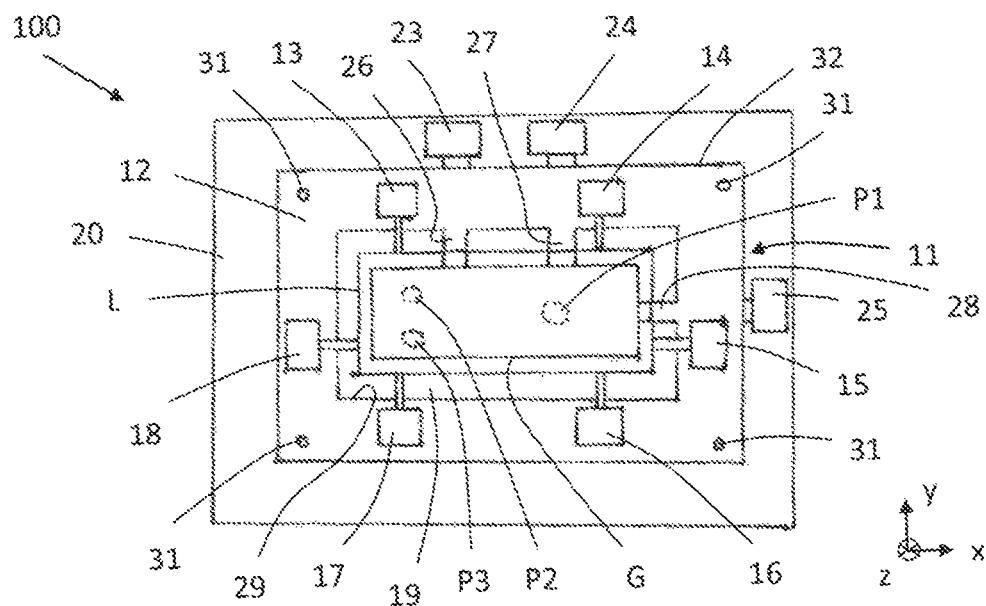
FIG. 1 is a schematic representation of a device according to the invention, in a plan view from above.
Figure 2:
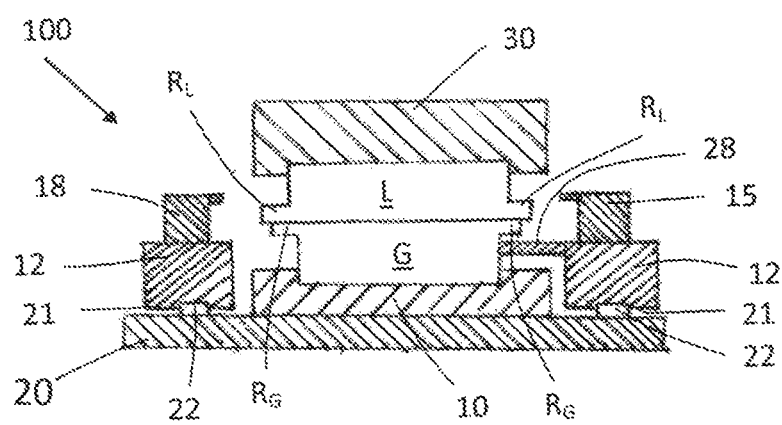
FIG. 2 is a schematic sectional view of the device shown in FIG. 1.

FIGS. 1 and 2 schematically show a device 100 for joining a lens L with a housing G of a lighting device of a motor vehicle. The joining of the lens L with the housing G takes place by means of a joining process, in particular a welding process, in that the edge region $R_L$ of the lens is cohesively connected with the edge region $R_G$ of the housing G. Before joining, the lens L and the housing G must be aligned with one another to compensate any tolerance deviations.

The device 100 has for this purpose a receiver 10 for receiving the housing G. In the receiver 10, the housing G can be aligned using a reference point system, in that the housing G is placed on this reference point system. In the embodiment shown here, the reference point system comprises three reference points P1, P2 and P3. These reference points P1, P2, P3 are provided or positioned in an x-y-plane. By means of the reference points P1, P2, P3, a defined positioning of the housing G can take place in the receiver 10 and thus in the device 100.

Furthermore, the device 100 includes a pre-centering device 11 for positioning the lens L on the housing G.

The pre-centering device 11 has a frame element 12 and a plurality of positioning elements 13, 14, 15, 16, 17, 18 that are secured to the frame element 12.

The frame element 12 is plate-shaped and has a window-like opening 19, so that the frame element 12 can be arranged around the receiver 10. The frame element 12 annularly encloses the receiver 10, wherein the frame element 12 is preferably polygonal.

Both the frame element 12 and the receiver 10 are arranged on a base plate 20. The receiver 10 is fixedly positioned on the base plate 20. The frame element 12, however, is movably supported on the base plate 20. For the movable support, as shown in FIG. 2, a plurality of bearing elements 22, for example in the form of ball bushings, can be arranged distributed on an underside 21 of the frame element 12 pointing in the direction of the base plate 20. Due to the movable support of the frame element 12, this can be moved relative to the fixedly positioned receiver 10, in particular during the pre-centering process. The frame element 12 can be moved relative to the receiver 10 in such a way that the lens L can be aligned relative to the housing G received in the receiver 10. By aligning the lens L with the housing G, the lens L is aligned using the reference point system and thus with the reference points P1, P2 and P3, with which the housing G is also aligned.

The movement of the frame element 12 is pneumatically or electrically controllable. In the embodiment shown in FIG. 1, a plurality of pneumatic cylinders 23, 24, 25 is provided, which can control the movement of the frame element 12. The movement of the frame element 12 is effected in the x- and y-direction, so that the frame element 12 can be moved in parallel with the base plate 20. To effect the shifting movement of the frame element 12, the pneumatic cylinders 23, 24, 25 engage at an outer circumferential surface 32 of the frame element 12.

For pre-centering, a plurality of stop elements 26, 27, 28 is integrally formed on the frame element 12. These stop elements 26, 27, 28 are designed as web-like projections and protrude from the inner surface 29 pointing in the direction of the receiver 10, in the region of the window-like opening 19 of the frame element 12. By means of the stop elements 26, 27, 28, the frame element 12 and the cylinders 23, 24, 25, can be aligned and clamped to the housing G received in the receiver 10.

The lens L is received, aligned and clamped in the pre-centering device 11 via the positioning elements 13, 14, 15, 16, 17, 18. The positioning elements 13, 14, 15, 16, 17, 18 are arranged distributed over the circumference of the frame element 12. By the positioning elements 13, 14, 15, 16, 17, 18 being fixedly positioned on the movably supported frame element 12, the positioning elements 13, 14, 15, 16, 17, 18 can also be aligned relative to the housing G received in the receiver 10 during a movement of the frame element 12.

A certain number of positioning elements 13, 14, 15, 16, 17, 18 are designed as block slides and a certain number of positioning elements 13, 14, 15, 16, 17, 18 are designed as spring-loaded slides. In the embodiment shown here, three positioning elements 13, 14, 15 are designed as block slides and three positioning elements 16, 17, 18 are designed as spring-loaded slides. By designing the positioning elements 13, 14, 15, 16, 17, 18 as block slides and as spring-loaded slides, the lens L can be aligned when it is received in the positioning elements 13, 14, 15, 16, 17, 18, before it is clamped between the positioning elements 13, 14, 15, 16, 17, 18. In each case, a positioning element 16, 17, 18 designed as a spring-loaded slide is positioned opposite a positioning element 13, 14, 15 designed as a block slide.

After the pre-centering process, the lens L can be grasped by a holder 30 by generating negative pressure, and be lifted up out of the pre-centering device 11 by the holder 30. During the subsequent joining process, the lens L can be held by the holder 30. The holder 30 is positioned in the z-direction above the receiver 10 and above the pre-centering device 11. The holder 30 is movable in the z direction, so that the lens held in the holder 30 can be set on the housing G joined in the receiver 10 and also lifted therefrom by a shifting movement of the holder 30.

Figure 3:
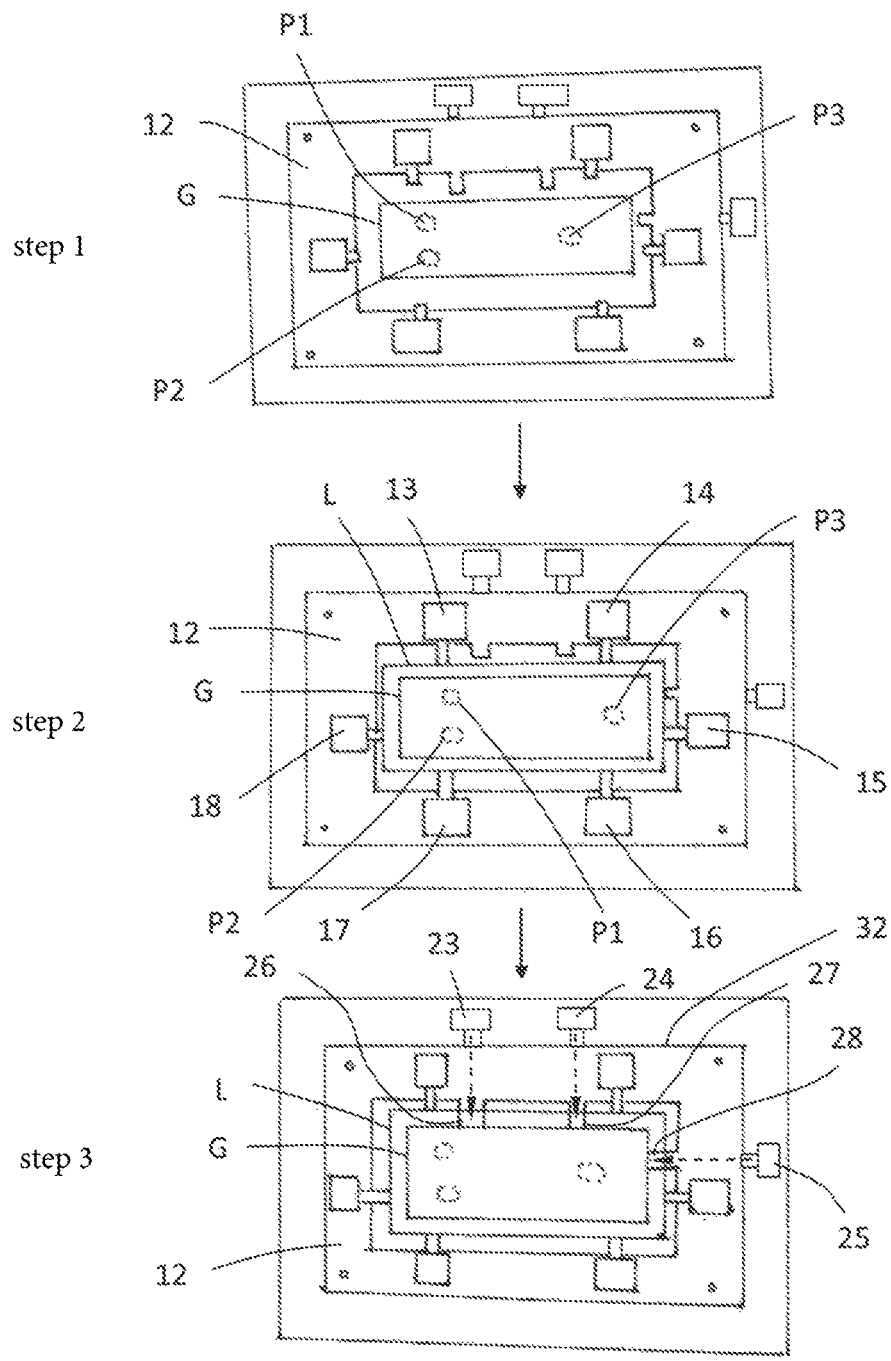
FIG. 3 is a schematic representation of a process of aligning a lens with a housing of a lighting device by means of the device shown in FIG. 1.

FIG. 3 shows a pre-centering process of a lens L on a housing G.

In step 1, the housing G is placed on the reference points P1, P2, P3 of the reference point system and fixed in this position in the receiver 10.

In the subsequent step 2, the lens L is placed on the housing G, received by the positioning elements 13, 14, 15, 16, 17, 18, and clamped between the positioning elements 13, 14, 15, 16, 17, 18, in that the lens L is brought to bear against the positioning elements 13, 14, 15 designed as block slides, and then, the positioning elements 16, 17, 18 designed as spring-loaded slides are moved against the lens L so that the lens L is clamped against the positioning elements 13, 14, 15 designed as block slides.

In the subsequent step 3, the pre-centering device 11 is aligned together with the joined lens L relative to the housing G which has been received in the receiver 10. In this case, by a control via the pneumatic cylinders 23, 24, 25, as indicated by the dashed arrows, the frame element 12 planarly supported to be movable in a plane is moved with its stop elements 26, 27, 28 against the housing G received in the receiver 10 and is thereby aligned with the housing G. The frame element 12 is first moved in the y-direction by means of the pneumatic cylinders 23, 24 acting on a longitudinal edge of the outer circumferential surface 32 of the frame element 12 in such a manner that initially, the stop elements 26, 27 to be positioned on the longitudinal side of the housing G bear against the housing G. Subsequently, the frame element 12 is moved in the x-direction via the pneumatic cylinder 25 acting on a transverse edge of the outer circumferential surface 32 of the frame element 12 in such a way, that the stop element 28 bears against the transverse side of the housing G. The frame element 12 then lies with all its stop elements 26, 27, 28 on the housing G. The frame element 12 and also the lens L received between the positioning elements 13, 14, 15, 16, 17, 18 is thereby aligned relative to the housing G and thus also aligned relative to the reference points P1, P2, P3 of the reference point system. The lens L is now pre-centered and optimally aligned relative to the housing G and the reference point system.

Subsequently, the holder 30 can be moved in the z direction downwards towards the lens L to remove the latter from the pre-centering device 11, see FIG. 2. Here, the holder 30 can receive and hold the pre-centered and aligned lens L by applying negative pressure. In a next step, the joining process can then be initiated for the cohesive connection of the pre-centered lens L with the housing G.

This can be done in such a way that after the lens L has been transferred from the positioning elements 13, 14, 15, 16, 17, 18 to the holder 30, the lens L is first moved upwards by the holder 30 and thus moved away from the housing G. Subsequently, infrared emitters can be introduced, which heat the welding contours of the housing G and of the lens L. The welding contours can be the edge region $R_G$ of the housing G and the edge region $R_L$ of the lens L. Subsequently, the infrared emitters can be removed and the lens L held in the holder 30 can be lowered in the direction of the housing G until the lens L sits with its welding contour or its edge region $R_L$ on the welding contour or the edge region $R_G$ of the housing G. Subsequently, the actual joining, in particular welding, can take place. For example, this can be done by means of a friction welding process.

The invention is not limited in its execution to the above preferred embodiment. Rather, a number of variants are conceivable, which make use of the illustrated solution even with fundamentally different types of embodiments. All of the features and/or advantages arising from the claims, the description or the drawings, including design details, spatial arrangements and process steps, can be essential to the invention both individually and in different combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for joining a lens on a housing of a lighting device of a motor vehicle, the method comprising:
   receiving the housing;
   securing the housing in a receiver; and
   positioning and aligning the lens on the housing during a pre-centering process that occurs after securing the housing in the receiver, the pre-centering process using a pre-centering device having a frame element and a plurality of positioning elements attached to the frame element;
   wherein the pre-centering process includes clamping the lens between the positioning elements of the frame element and then moving the frame element, with the lens already clamped thereto, relative to the receiver to align the lens on the housing, and
   wherein, during the moving of the frame element, the frame element is aligned with the housing by using a reference point system, the frame element being moved until stop elements formed on the frame element are brought to rest against the housing.

2. The method according to claim 1, wherein during the securing of the housing in the receiver, the housing is aligned using a reference point system having at least two reference points, and/or wherein the lens is aligned by using the reference point system.

3. The method according to claim 1, wherein during the clamping of the lens between the positioning elements, the lens is aligned and fixed between the positioning elements.

4. The method according to claim 1, wherein the frame element is movably supported on a base plate, wherein actuators are mounted on the base plate, and wherein the actuators move the frame element until the stop elements of the frame element are brought to rest against the housing to thereby align the frame element with the housing.

5. The method according to claim 1, wherein, after the pre-centering process in which the lens is aligned on the housing, the lens is received by a holder and is removed from the pre-centering device, and wherein following the pre-centering process, a joining process is started, wherein the lens is integrally joined with the housing.

6. The method according to claim 1, wherein the positioning elements include block slides and spring-loaded slides, wherein the block slides are attached to an opposite side of the frame element as the spring-loaded slides so as to clamp the lens therebetween.

7. The method according to claim 1, wherein the frame element has an opening that annularly surrounds the receiver and wherein the stop elements of the frame element protrude inward in a direction towards the receiver.

8. The method according to claim 1, wherein the frame element is movable in two directions in a same plane.

* * * * *